United States Patent
Park et al.

(10) Patent No.: US 7,638,043 B2
(45) Date of Patent: Dec. 29, 2009

(54) GRIT CHAMBER FOR WASTEWATER TREATMENT PLANT, CAPABLE OF PREVENTING SEDIMENTATION OF ORGANIC MATERIAL

(75) Inventors: Kyung In Park, Gunpo-si (KR); Doo Yun Hwang, Seoul (KR)

(73) Assignee: Blue Whale Screen Co., Ltd., Gyeonggi-Do (KR)

( * ) Notice: Subject to any disclaimer, the term of this patent is extended or adjusted under 35 U.S.C. 154(b) by 569 days.

(21) Appl. No.: 11/632,393

(22) PCT Filed: Jul. 21, 2005

(86) PCT No.: PCT/KR2005/002370

§ 371 (c)(1),
(2), (4) Date: Jan. 11, 2007

(87) PCT Pub. No.: WO2006/011726

PCT Pub. Date: Feb. 2, 2006

(65) Prior Publication Data

US 2008/0041774 A1    Feb. 21, 2008

(30) Foreign Application Priority Data

Jul. 27, 2004  (KR) .................... 10-2004-0058532
Jan. 18, 2005  (KR) .................... 10-2005-0004657

(51) Int. Cl.
*B01D 21/02* (2006.01)

(52) U.S. Cl. .................... 210/86; 210/87; 210/137; 210/528

(58) Field of Classification Search .................... 210/86, 210/87, 97, 137, 523, 528, 532.1
See application file for complete search history.

(56) References Cited

U.S. PATENT DOCUMENTS 3,630,372 A    12/1971   Weir et al.
2004/0011738 A1   1/2004   Albertson

FOREIGN PATENT DOCUMENTS

| EP | 1306116 | 5/2003 |
|---|---|---|
| JP | 2001025610 | 1/2001 |
| KR | 0346465 | 3/2004 |

OTHER PUBLICATIONS

International Search Report mailed on Jan. 12, 2006 by the Korean Intellectual Property Office in counterpart application No. PCT/KR2005/002370.
International Preliminary Report on Patentability completed Jul. 26, 2006 by the Korean Intellectual Property Office in counterpart foreign application No. PCT/KR2005/002370.

*Primary Examiner*—Terry K Cecil
(74) *Attorney, Agent, or Firm*—Abelman, Frayne & Schwab

(57) ABSTRACT

A grit chamber for a wastewater treatment plant. A vertical floodgate is installed on a partitioning wall and is driven in a vertical direction to be opened downwardly from a top toward a bottom. A floodgate driving motor is coupled to one end of the vertical floodgate to directly drive the vertical floodgate. An inflow amount measurement sensor functions to stepwisely measure a flow amount of wastewater which passes through a wastewater tank. A control section is connected to the floodgate driving motor and the inflow amount measurement sensor to control the floodgate driving motor in response to a measurement result of the inflow amount measurement sensor. A wastewater level is adjusted within a predetermined range through operation of the vertical floodgate to maintain a constant flow velocity of wastewater which passes through a sand sedimentation zone, thereby preventing organic material which is contained in the wastewater and is other than sand, from sedimenting.

8 Claims, 6 Drawing Sheets

GRIT CHAMBER FOR WASTEWATER TREATMENT PLANT, CAPABLE OF PREVENTING SEDIMENTATION OF ORGANIC MATERIAL

TECHNICAL FIELD

The present invention relates, in general, to a grit chamber which is installed in a wastewater treatment plant to sediment and remove the sand contained in wastewater and, more particularly, to a device which allows the flow velocity of wastewater to be constantly maintained even when the inflow amount of wastewater to pass through a grit chamber sharply fluctuates, thereby preventing sedimentation of organic material, improving sand removal efficiency, and ensuring normal use of the grit chamber.

BACKGROUND ART

Generally, a mechanical grit chamber, which is installed at an entrance of a conventional small or medium-sized wastewater treatment plant, comprises a rectangular wastewater tank made of steel. While wastewater introduced into the wastewater tank flows to be discharged, due to a flow velocity of wastewater flowing in the wastewater tank, sand of no less than a predetermined grain size sediments, and organic material and sludge of no greater than the predetermined grain size are discharged out of the wastewater tank without sedimenting. However, in this mechanical grit chamber, specifically other than a civil-engineered grit chamber, a high partition wall must be installed adjacent to an exit of the wastewater tank to increase a retention time of wastewater over a short distance so that wastewater can overflow the partition wall to be discharged out of the wastewater tank. The grit chamber is designed such that wastewater can pass through the wastewater tank at a flow velocity of about 0.3 m/sec when assuming a maximum inflow amount, and that sand having a grain size of no less than about 0.2 mmΦ can sediment for a retention time of about 30~60 seconds. If an inflow amount of wastewater decreases, a passage velocity of wastewater naturally decreases in proportion to the inflow amount of wastewater, by which a problem is provoked.

A decrease in a passage velocity of wastewater means that wastewater stays in the wastewater tank for a time which is longer than a designed appropriate retention time, as a result of which even the sand having a grain size of no greater than about 0.2 mmΦ and organic material having a low specific gravity can sediment in the wastewater tank.

Concretely speaking, it is the norm that an amount of wastewater sharply varies by various factors. Specifically, the discharge of sewage which occupies the most of the wastewater abruptly increases after a breakfast meal and an evening meal among day times. Therefore, when designing a grit chamber, a flow velocity of wastewater cannot but be determined by assuming a maximum inflow amount of wastewater. During the other times which correspond to about 90% of a day, an inflow amount of wastewater reaches only about 10~20% of the maximum inflow amount of wastewater. Therefore, during most times of a day, a flow velocity of wastewater which passes through the wastewater tank reaches only about 1/10~1/5 of an originally designed flow velocity.

Hence, as organic material and sludge, which must not sediment but pass through the wastewater tank for a next process, sediment in the grit chamber together with sand, is pushed toward an inlet by a horizontal conveyance screw, and then removed out of the wastewater tank by a take-out screw which is installed at an inclination angle of 30. Since the sedimented mixture has flowability such as slurry, in the case of a shaftless take-out screw which is mainly adopted, the sedimented mixture streams downwards profusely through a shaftless portion defined in the center of the screw while being pushed upward, whereby the mixture cannot be properly removed. Also, even in the case that a take-out screw having a shaft portion is applied, in order to take out sand having a certain grade of dryness, the take-out screw must be designed to rotate at a low speed with a high torque, by which most of the sedimented mixture is likely to stream down between the take-out screw and an outer casing before arriving at the top of the take-out screw, whereby the mixture cannot be properly removed. Hence, if the take-out screw having the shaft is designed as a screw pump to rotate at a high speed with a low torque, quick abrasion of a lubrication lining intervened between the take-out screw and the casing is caused. Also, if sand having a high grade of dryness is taken out as an increased amount of sand is introduced into the wastewater tank, since the torque of a driving motor is small, the take-out screw is apt to be stopped due to a drag force induced by the casing and the sand, whereby breakage of a mechanical operating system may result. In this regard, it is not economic to adopt a motor which can generate significantly high power to provide a high torque.

In order to cope with these problems, a bucket type grit chamber can be applied in place of the screw type grit chamber to efficiently remove the mixture. Nevertheless, even in this case, since the mixture containing organic material and sludge has flowability such as slurry, the amount of the mixture increases up to three times when compared to the case in which only sand is taken out. Also, it is difficult to deliver the mixture using a conveyor since the mixture streams like water, and when storing the mixture, the mixture is apt to leak out of a storage hopper. The transportation of the mixture costs two or three times an expense which is incurred when transporting only the sand. Further, the mixture can be rejected as being improper to be reclaimed at a reclaiming site, whereby reliable operation of the grit chamber cannot be ensured. That is to say, as the grit chamber is left alone without being operated, wastewater processing efficiency cannot but be deteriorated at downstream wastewater treatment plants. Since these problems also occur in the civil-engineered grit chamber, it is to be understood that most grit chambers of wastewater treatment plants cannot but be abnormally operated.

DISCLOSURE OF INVENTION

Technical Problem

Accordingly, the present invention has been made keeping in mind the above problems occurring in the prior art, and an object of the present invention is to provide a structure of a grit chamber which can maintain a constant flow velocity of wastewater to pass through the grit chamber even when the inflow amount of wastewater sharply fluctuates, so that, when the inflow amount of wastewater decreases, sedimentation of organic material and sludge having low specific gravity is prevented, and only the material having high specific gravity such as sand possessing a relatively high grade of dryness can sediment and be removed.

Another object of the present invention is to provide a grit chamber for a wastewater treatment plant, which allows only the material having high specific gravity such as sand possessing a relatively high grade of dryness to sediment and be removed, so that conveyance over a short distance, storage, and/or transportation to a reclaiming site of the removed sand can be easily implemented with high economic efficiency, and the removed sand is not excluded from being used for a reclaiming purpose in the reclaiming site, thereby ensuring reliable use of the grit chamber.

Technical Solution

In order to achieve the above objects, according to the present invention, there is provided a grit chamber for a wastewater treatment plant, including a wastewater tank having a front wall which is defined with a wastewater inlet, a rear wall which faces the front wall and is defined with a wastewater outlet, a pair of side walls which connect the front wall and the rear wall and a partitioning wall which is formed adjacent to the rear wall to extend across a space defined between the pair of side walls, and sand discharge means for discharging sand sedimented in a sand sedimentation zone which is delimited by the front wall, the pair of side walls and the partitioning wall, the grit chamber comprising a vertical floodgate installed on the partitioning wall and driven in a vertical direction to be opened downwardly from a top toward a bottom; a floodgate driving motor coupled to one end of the vertical floodgate to directly drive the vertical floodgate; an inflow amount measurement means for stepwisely measuring an inflow amount of wastewater which passes through the wastewater tank; and control means connected to the floodgate driving motor and the inflow amount measurement means to control the floodgate driving motor in response to a measurement result of the inflow amount measurement means, wherein a wastewater level in the sand sedimentation zone is adjusted within a predetermined range through operation of the vertical floodgate so that a cross-sectional passage area of wastewater is changed to maintain a constant flow velocity of wastewater which passes through the sand sedimentation zone, thereby preventing organic material which is contained in the wastewater and is other than sand, from sedimenting in the sand sedimentation zone.

In the grit chamber according to the present invention, a vertical floodgate is installed on a partitioning wall in a manner such that the vertical floodgate can be opened by being moved downward. Opening and closing of the vertical floodgate is controlled due to the fact that the vertical floodgate is operationally connected to inflow amount measurement means for measuring an inflow amount of wastewater which flows into the grit chamber. In this way, it is possible to adjust the cross-sectional area of the grit chamber through which wastewater passes. As a consequence, even when the inflow amount of wastewater decreases, the flow velocity of wastewater in the grit chamber can be constantly maintained, and thereby, organic material and sludge having low specific gravity are prevented from sedimenting in a sedimentation zone of the grit chamber.

BEST MODE FOR CARRYING OUT THE INVENTION

Figure 1:
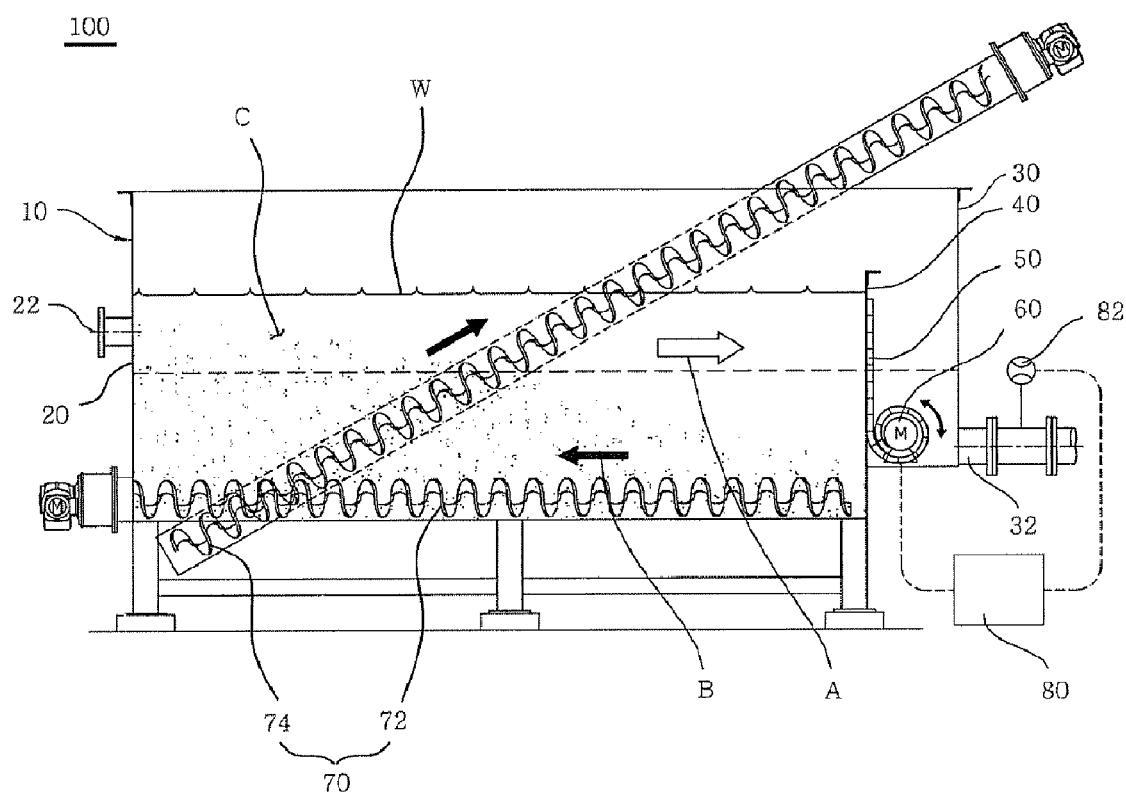
FIG. 1 is a front view schematically illustrating one embodiment of the present invention.

Reference should now be made to the drawings, in which the same reference numerals are used throughout the different drawings to designate the same or similar components.

Figure 2:
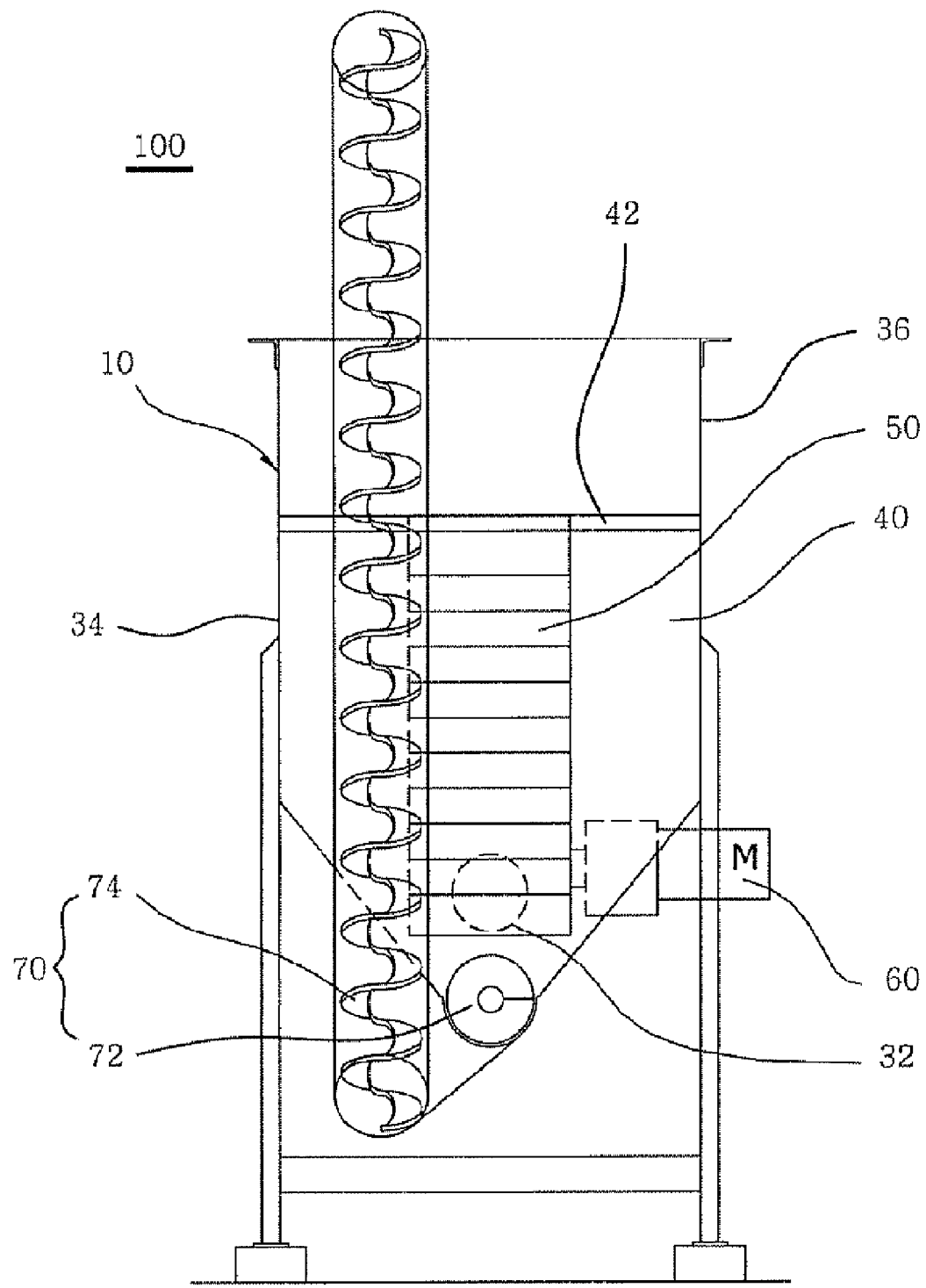
FIG. 2 is a side view schematically illustrating the one embodiment of the present invention.

FIG. 1 is a front view schematically illustrating one embodiment which is obtained by applying the present invention to a mechanical grit chamber, and FIG. 2 is a side view of FIG. 1. Referring to FIGS. 1 and 2, as in the conventional mechanical grit chamber for treating wastewater, the grit chamber 100 according to one embodiment of the present invention has a wastewater tank 10 which is mainly manufactured of steel. The wastewater tank 10 has a rectangular configuration. The wastewater tank 10 includes a front wall 20 which is defined with a wastewater inlet 22, a rear wall 30 which faces the front wall 20 and is defined with a wastewater outlet 32, and a pair of side walls 34 and 36 which connect the front wall 20 and the rear wall 30 with each other. In order to lengthen a retention time (a passage time) of wastewater which is introduced into the wastewater tank 10 through the wastewater inlet 22 and is discharged from the wastewater tank 10 through the wastewater outlet 32, a partitioning wall 40 is installed adjacent to the wastewater outlet 32. The partitioning wall 40 is reinforced by being supported by a partitioning wall support 42 which is formed at the upper end of the partitioning wall 40.

Wastewater can be discharged from the wastewater tank 10 through the wastewater outlet 32 only after overflowing the partitioning wall 40. In the conventional art, due to this fact, in the case that an inflow amount of wastewater increases, a flow velocity (a passage velocity) of wastewater which flows from the wastewater inlet 22 toward the wastewater outlet 32 in the wastewater tank 10 increases. In the case that an inflow amount of wastewater decreases, a flow velocity of wastewater decreases in proportion to the inflow amount, whereby a problem is caused. Here, the passage velocity can be understood as an average flow velocity of wastewater which passes through the wastewater tank 10.

In this consideration, in the present invention, a slide-type vertical floodgate 50 is installed on an intermediate portion of the partitioning wall 40, such that the vertical floodgate 50 can be opened downwardly from the top toward the bottom of the wastewater tank 10. The vertical floodgate 50 is operationally connected with inflow amount measurement means such as a flow meter 82 which is arranged adjacent to the wastewater inlet 22 or the wastewater outlet 32, so that, as an inflow amount of wastewater decreases, the vertical floodgate 50 can be opened downward to adjust a level of wastewater which passes through a sand sedimentation zone C defined in the wastewater tank 10.

The vertical floodgate 50 can be opened and closed by being driven upward and downward through a floodgate driving motor 60 which is mounted to one end of the vertical floodgate 50. The floodgate driving motor 60 is controlled by control means 80 which determines a height of the vertical floodgate 50 on the basis of a measurement from the flow meter 82.

In FIGS. 1 and 2, the arrow 'A' indicates a direction in which wastewater passes through the wastewater tank 10, the arrow 'B' indicates a direction in which sand sedimented in the wastewater tank 10 is conveyed, and the reference character 'C' represents the sand sedimentation zone which is surrounded by the front wall 20, the partition wall 40 and the pair of side walls 34 and 36 to allow sand to sediment therein.

Sand discharge means 70 comprises a horizontal conveyance screw 72 which horizontally conveys toward the front wall 20 sand sedimented in the sand sedimentation zone 'C' and a take-out screw 74 which takes the conveyed sand out of the wastewater tank 10.

Figure 3:
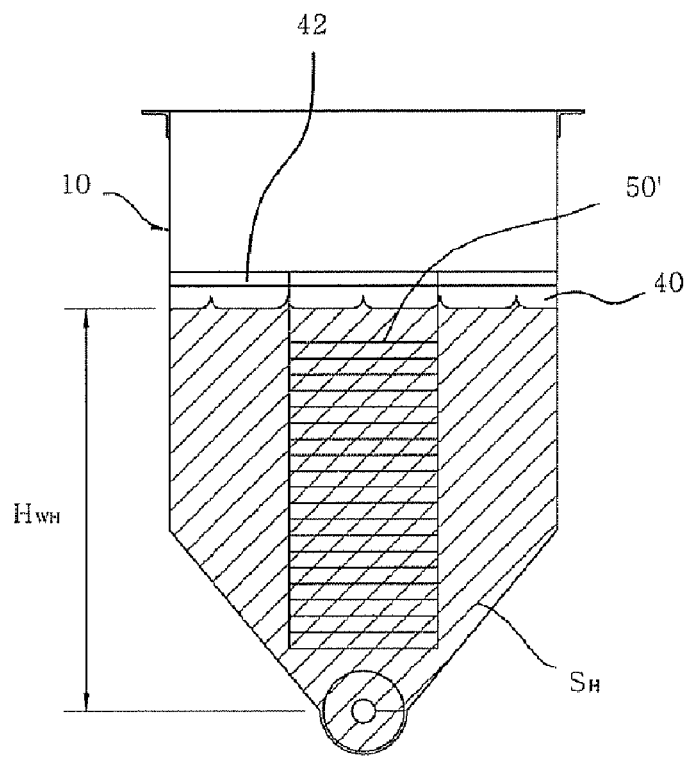
FIGS. 3 and 4 are side views illustrating operational situations of a vertical floodgate according to the present invention.
Figure 4:
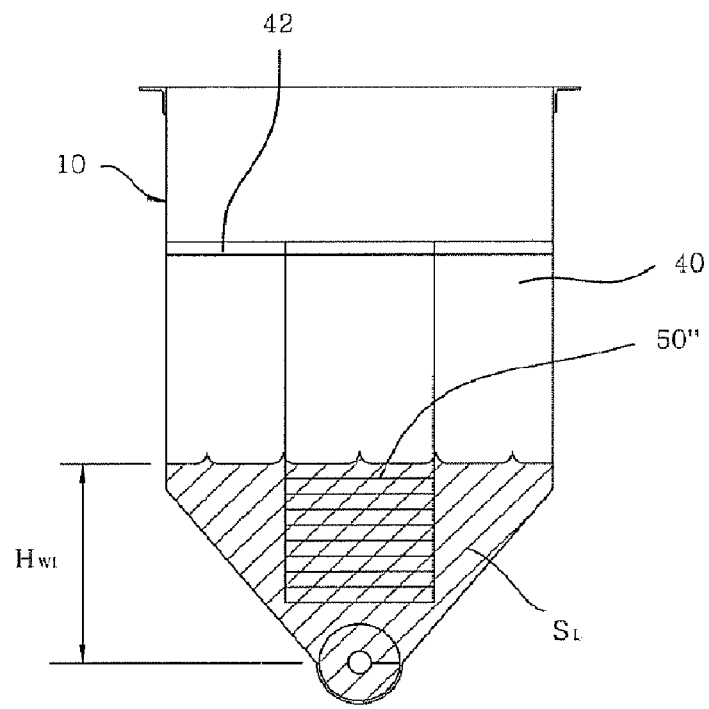

FIGS. 3 and 4 are side views illustrating situations in which the vertical floodgate 50 is closed and opened. These situations will be described below.

FIG. 3 illustrates a state in which the vertical floodgate 50' is raised to the maximum in response to a maximum inflow amount of wastewater. At this time, a height $H_{WH}$ of wastewater in the sand sedimentation zone is measured above the closed vertical floodgate 50' whereby a cross-sectional passage area $S_H$ of wastewater corresponds to the hatched area in FIG. 3. On the contrary, FIG. 4 illustrates a state in which the vertical floodgate 50" is lowered to the maximum in response to a minimum inflow amount of wastewater. At this time, a height $H_{WL}$ of wastewater in the sand sedimentation zone is measured above the opened vertical floodgate 50" whereby a cross-sectional passage area $S_L$ of wastewater corresponds to the hatched area in FIG. 4.

In this way, by adjusting a wastewater level by opening and closing the vertical floodgate 50, even in the case that an inflow amount of wastewater which is to pass through the wastewater tank 10 decreases, as the cross-sectional wastewater passage area $S_L$ in the wastewater tank 10 decreases as shown in FIG. 4, a flow velocity of the wastewater does not decrease and can be constantly maintained. That is to say, even when an inflow amount of wastewater decreases to ⅓ or ⅕ of the maximum inflow amount, the inflow amount measurement means such as the flow meter 82 (see FIG. 1) senses this situation and transmits a signal to the control means 80 such as a valve controller. The control means 80 controls the floodgate driving motor 60 which functions to drive the vertical floodgate 50, to open the vertical floodgate 50 to a height corresponding to a measured inflow amount of wastewater, whereby a cross-sectional passage area of wastewater which passes through the wastewater tank 10 decreases. Due to this decreased cross-sectional passage area, a passage velocity of wastewater in the wastewater tank 10 does not decrease lower than a passage velocity at a designed inflow amount, that is, at the maximum inflow amount, and is maintained as it is, to prevent sedimentation of organic material and sludge in the sand sedimentation zone 'C' of the wastewater tank 10.

At this time, while the flow meter 82 may comprise an open-type flow meter such as a Parshall flume flow meter, it is preferable to use a closed-type flow meter such as an ultrasonic flow meter. An actuator motor controller used as the control means 80 for controlling the floodgate driving motor 60 comprises a controller for controlling a conventional position control type automatic valve, so that floodgate opening and closing positions can be determined in conformity with an inflow amount of wastewater.

Figure 5:
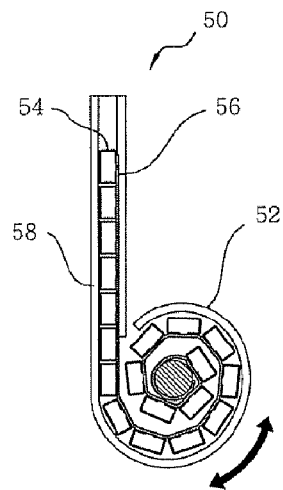
FIG. 5 is a side view of the vertical floodgate according to the present invention.
Figure 6:
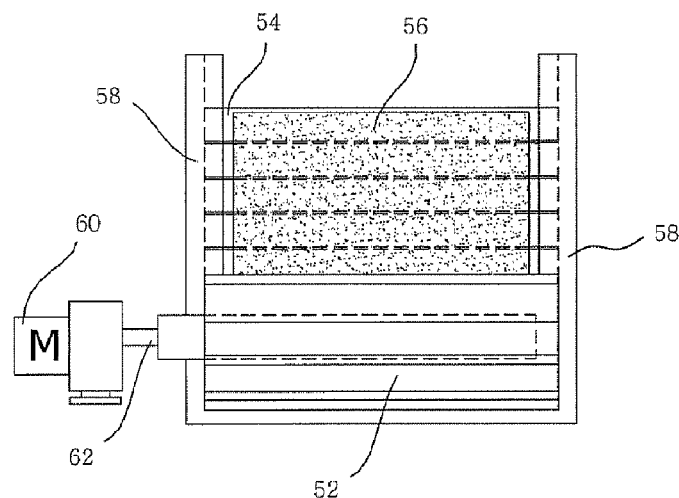
FIG. 6 is a front view of the vertical floodgate according to the present invention.
Figure 7:
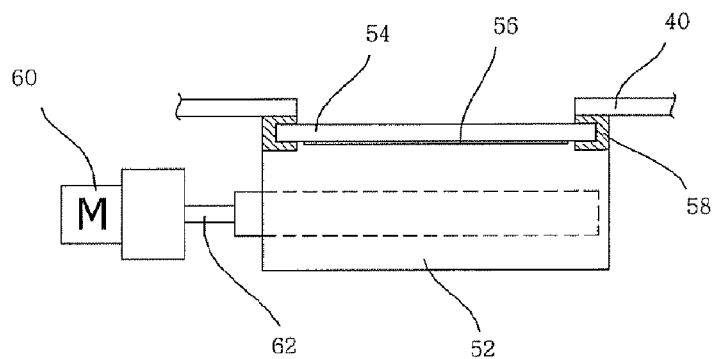
FIG. 7 is a plan view of the vertical floodgate according to the present invention.

FIGS. 5 through 7 are respectively a side view, a front view and a plan view of the vertical floodgate 50 according to one embodiment of the present invention. A structure of and a method for opening and closing the vertical floodgate 50 according to the present invention will be described with reference to these drawings.

It is preferred that the vertical floodgate 50 according to the present invention comprise not a corrugated accordion type floodgate but a slide type floodgate in which segmented flat pieces such as those used in a slide type cabinet or an antique desk are connected with one another. These segmented flat pieces 54 can be made of a material having a suitable strength in consideration of a width and a height of the vertical floodgate 50. As shown in FIGS. 5 and 6, the segmented flat piece 54 can be formed by bending a thin stainless steel plate into a square sectional shape or by adopting a stainless steel or aluminum chassis pipe having a rectangular sectional shape. By bonding a kemp cloth or a polyester cloth 56 which has high watertight quality to the rear surface of the vertical floodgate 50 using a rubber or synthetic resin-based adhesive which has a desired degree of watertightness and flexibility after curing, it is possible to manufacture the slide type vertical floodgate which can flexibly operate and is light and firm.

Also, as shown in FIG. 6, although the cloth 56 is bonded to most segmented flat pieces 54 which constitute the vertical floodgate 50, the cloth 56 is not bonded to both ends of the segmented flat pieces 54 which are engaged with the rails 58. This is to ensure that the vertical floodgate can be reliably opened and closed without being hindered due to friction generated between the wetted cloth 56 and the rails 58.

It is preferred that the rails 58 for the slide type vertical floodgate 50 be formed of engineering plastic-based material having a low frictional coefficient, such as UHMW-PE (ultra high molecular weight polyethylene). This material reduces friction between the fragmented flat pieces 54 formed of stainless steel and the rails 58 to ⅓~⅐ of its original value so that the vertical floodgate 50 can be reliably operated with a low driving force. The floodgate driving motor 60 such as the actuator motor for opening and closing the slide type vertical floodgate 50 can comprise a servo motor for controlling a conventional automatic valve.

When the floodgate driving motor 60 is a water-proofing type, the floodgate driving motor 60 can be integrally attached adjacent to the vertical floodgate 50 inside the wastewater tank 10. In order to ensure for watertightness over a lengthy period of time and prepare for random situations such as repair, replacement, and so forth, it is preferred that a rotation shaft 62 of the floodgate driving motor 60 which is inserted into a lower winding section 52 of the vertical floodgate 50 be extended out of the wastewater tank 10, the floodgate driving motor 62 be installed outside the wastewater tank 10, and a portion of the wastewater tank 10 through which the rotation shaft 62 extends be sealed using a gland packing.

If desired, the lower part of the vertical floodgate 50 may not be formed in the shape of the winding section 52 (see FIG. 5) but be formed in the shape of an L, and a linear actuator (not shown) such as a pneumatic cylinder and a hydraulic cylinder may be installed at an end of the L-shaped lower part to be linearly operated in consideration of watertightness.

Figure 8:
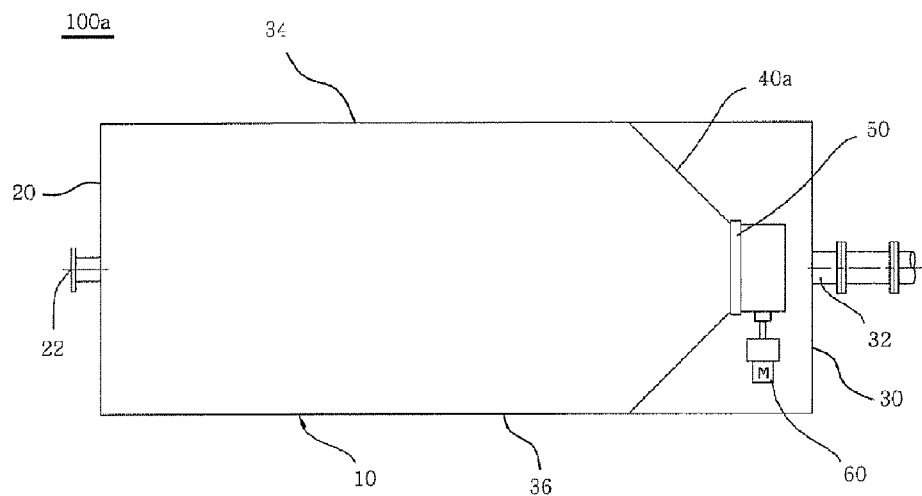
FIG. 8 is a plan view schematically illustrating another embodiment of the present invention.

FIG. 8 is a plan view schematically illustrating a grit chamber 100a in accordance with another embodiment of the present invention. The construction of the grit chamber 100a will be described with reference to FIG. 8.

Referring to FIG. 8, as in the aforementioned embodiment of the present invention, the grit chamber 100a has a wastewater tank 10. The wastewater tank 10 includes a front wall 20 which is defined with a wastewater inlet 22, a rear wall 30 which is defined with a wastewater outlet 32, and a pair of side walls 34 and 36 which connect the front wall 20 and the rear wall 30 with each other. The wastewater tank 10 further includes a partition wall 40a on which a vertical floodgate 50 is installed to be opened downwardly from the top toward the bottom of the wastewater tank 10 by a floodgate driving motor 60. At this time, differently from the aforementioned embodiment, in this embodiment of the present invention, the partition wall 40a is diverged from its intermediate portion on which the vertical floodgate 50 is installed, toward the front wall 20, so that the left and right portions of the partitioning wall 40a extend outward from the intermediate portion to the pair of side walls 34 and 36. By this fact, it is possible to prevent floating matters from accumulating at the corners of the wastewater tank 10 adjacent to the partitioning wall 40.

Meanwhile, heretofore, it was described that the flow meter capable of directly measuring an inflow amount of wastewater is used as the inflow amount measurement means to drive the vertical floodgate in real time. However, in this embodiment of the present invention, a level sensor capable of indirectly measuring an inflow amount of wastewater by detecting a wastewater level in the wastewater tank at predetermined intervals (heights) is used as the inflow amount measurement means, so that the vertical floodgate can be driven in a stepwise manner while being interconnected with the level sensor.

While the real-time driving of the vertical floodgate has a feature in that a constant passage velocity of wastewater can be maintained, in order to ensure the real-time driving of the vertical floodgate, a relatively expensive flow meter is required. Also, because the vertical floodgate must be driven in real time by receiving a measurement result from the flow meter, the floodgate driving motor must be continuously operated. Considering this, in this embodiment of the present invention, a relatively inexpensive level sensor is used as the inflow amount measurement means so that the vertical floodgate can be driven stepwisely in response to measurements from the level sensor.

Figure 9:
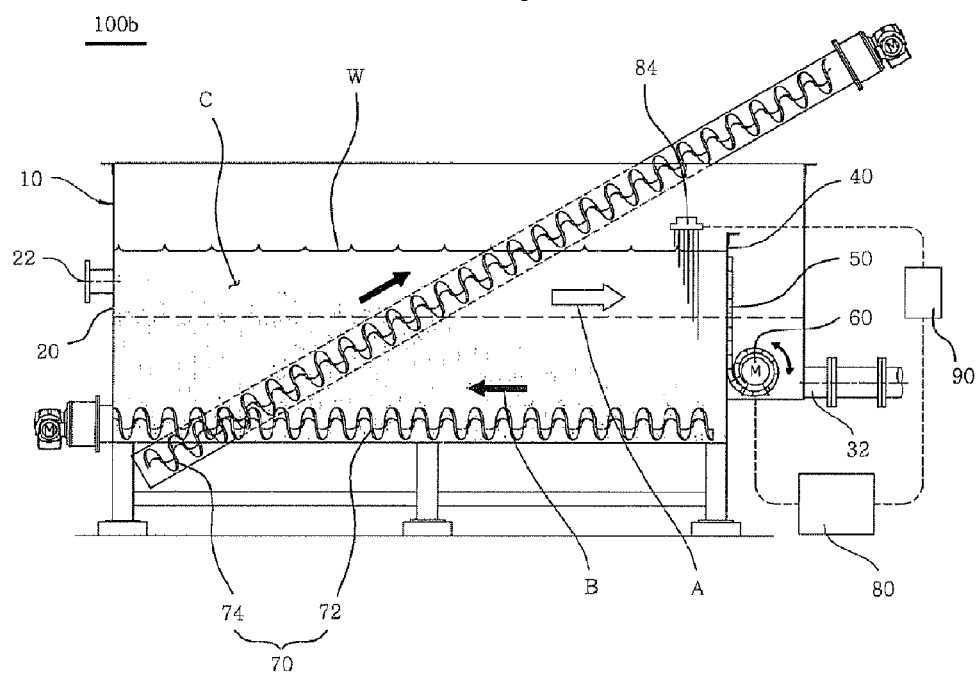
FIG. 9 is a front view schematically illustrating still another embodiment of the present invention.
Figure 10:
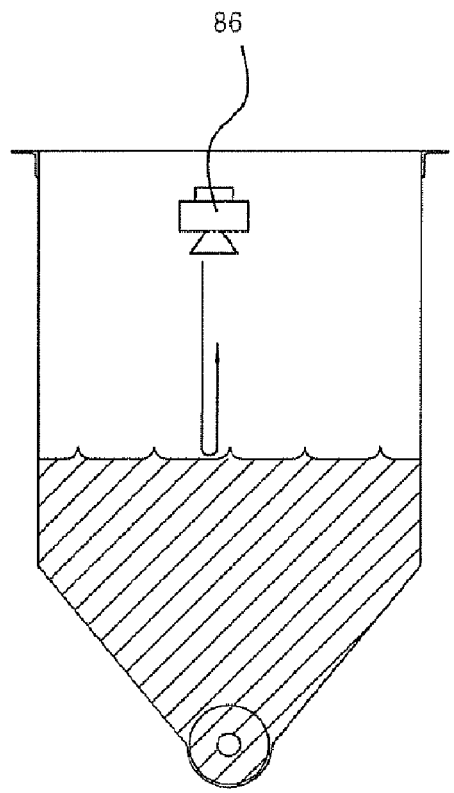
FIGS. 10 and 11 are views illustrating level sensors applied to the present invention.
Figure 11:
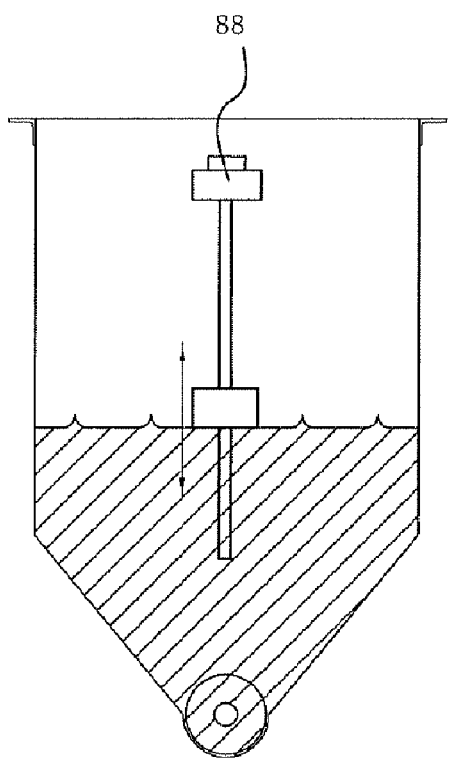

FIG. 9 is a front view illustrating a grit chamber according to the present invention which is characterized in that a level sensor is used as the inflow amount measurement means, and FIGS. 10 and 11 illustrate other sensors which are different from that shown in FIG. 9. The embodiment of the present invention to which the level sensor is applied will be described with reference to these drawings. For reference, the grit chamber 100b shown in FIG. 9 has the same construction as that shown in FIG. 1 except that an electrode rod type level sensor 84 is used in place of the flow meter 82. Therefore, detailed description of the grit chamber 100b will be omitted herein.

In FIG. 1, the flow meter 82 is installed adjacent to the wastewater inlet 22 and is connected with the floodgate driving motor 60 via the control means 80. However, in FIG. 9, the electrode rod type level sensor 84 is disposed above the sand sedimentation zone C in the wastewater tank 10 and is connected with the floodgate driving motor 60 via a level controller 90 and control means 80.

The electrode rod type level sensor 84 is separately installed above the sand sedimentation zone C, and comprises a plurality of electrode rods which extend downward toward the sand sedimentation zone C. These electrode rods have different lengths to indicate wastewater levels of different heights. In this way, by using the electrode rod type level sensor 84 comprising the electrode rods having different lengths, it is possible to detect a wastewater level in the sand sedimentation zone C. By detecting a wastewater level using the level sensor 84, the level controller 90 can calculate a change in wastewater level, and the control means 80 can drive the floodgate driving motor 60 on the basis of the calculated wastewater level change to adjust a height of the vertical floodgate 50.

While FIG. 5 illustrates an example in which the level controller 90 is constructed separately from the level sensor 84, it is to be readily understood that the level controller 90 can be manufactured integrally with the level sensor 84.

Meanwhile, FIGS. 10 and 11 respectively illustrate an ultrasonic level sensor 86 and a float type level sensor 88 as different kinds of level sensors. For the sake of convenience of explanation, only a wastewater level in the wastewater tank of the grit chamber and the level sensor are schematically illustrated in each drawing. The ultrasonic level sensor 86 emits ultrasonic waves onto the wastewater and employs the ultrasonic waves reflected on the surface of the wastewater. In the float type level sensor 88, a float which is movably fitted into a vertical guide disposed in the wastewater tank is moved upward and downward along the vertical guide depending upon a change in the wastewater level. Therefore, so long as it is possible to detect in a stepwise manner a wastewater level, any kind of level sensors can be used in the present invention.

Next, the level sensors for detecting a wastewater level and a principle in which the vertical floodgate is driven while being interconnected with the level sensors will be described.

First, the wastewater level inside the sand sedimentation zone C is divided into a plurality of wastewater levels (for example, $L_1, L_2, \ldots, L_6$) including a maximum wastewater level and a minimum wastewater level. Thereafter, the level sensor is installed to be able to detect respective levels of wastewater. A height through which the vertical floodgate can be driven is divided into a plurality of heights (for example, $G_1, G_2, \ldots, G_6$) including a maximum height and a minimum height.

At this time, the wastewater level $L_n$ (n=1~6) represents a position of the level sensor which is installed in correspondence with the wastewater level $L_n$, and, for the sake of convenience of explanation, is described as a wastewater level. Accordingly, when compared to FIGS. 3 and 4, the maximum wastewater level $H_{WH}$ corresponds to $L_1$, and the minimum wastewater level $H_{WL}$ corresponds to $L_6$. Further, the height of the vertical floodgate 50' (see FIG. 3) which corresponds to the maximum wastewater level $H_{WH}$ is designated by $G_1$, and the height of the vertical floodgate 50" (see FIG. 4) which corresponds to the minimum wastewater level $H_{WL}$ is designated by $G_6$.

For example, it is assumed that, in the case of the maximum wastewater level $L_1$, the vertical floodgate is positioned at the maximum height $G_1$. In this state, if an inflow amount of wastewater and a wastewater level decrease and the level sensor detects the wastewater level $L_2$, a changed amount ($L_1 \rightarrow L_2$) in wastewater level is calculated by the level controller. Thereafter, as the control means drives the floodgate driving motor, the vertical floodgate is adjusted to have a decreased height $G_2$. If an inflow amount of wastewater and a wastewater level further decrease through a multitude of steps, the vertical floodgate is adjusted to corresponding heights ($G_3, G_4, \ldots, G_6$) depending upon changed amounts ($L_2 \rightarrow L_3$, $L_3 \rightarrow L_4$, $L_4 \rightarrow L_5$, $L_5 \rightarrow L_6$) in wastewater level. Therefore, in the case that an inflow amount of wastewater and a wastewater level decrease, a height of the vertical floodgate is adjusted to a decreased height depending upon a changed amount (a reduced amount) in wastewater level, whereby a flow velocity (a passage velocity) at which wastewater passes through the grit chamber can be constantly maintained.

Similarly, it is assumed that, in the case of the minimum wastewater level $L_6$, the vertical floodgate is positioned at the minimum height $G_6$. In this state, if an inflow amount of wastewater and a wastewater level increase through a multitude of steps, the level sensor detects the respective wastewater levels (for example, $L_5, L_4, \ldots, L_1$) and changed amounts ($L_6 \rightarrow L_5, L_5 \rightarrow L_4, \ldots, L_2 \rightarrow L_1$) in wastewater level are calculated by the level controller. Thereafter, the vertical floodgate is adjusted to corresponding heights ($G_5, G_4, \ldots, G_1$) depending upon the changed amounts in wastewater level. Therefore, in the case that an inflow amount of wastewater and a wastewater level increase, a height of the vertical floodgate is adjusted to an increased height depending upon a changed amount (an increased amount) in wastewater level, as a result of which a flow velocity (a passage velocity) at which wastewater passes through the grit chamber can be constantly maintained.

In addition, in the case that a height of the vertical floodgate is adjusted depending upon a changed amount in wastewater level, the vertical floodgate can be driven immediately after detection of the change in wastewater level or can be driven with a predetermined delay time after detection of the change in wastewater level. For example, by driving the vertical floodgate motor about 10 seconds after a changed amount ($L_2 \rightarrow L_3$) in wastewater level is detected, the vertical floodgate can be adjusted to a height $G_3$ which corresponds to the changed amount ($L_2 \rightarrow L_3$).

While it was described for the sake of convenience of explanation that the height of the vertical floodgate is adjusted by assuming a case in which a wastewater level continuously increases or decreases, it is to be readily appreciated that a height of the vertical floodgate can be adjusted even when the wastewater level increases and decreases erratically.

In the present invention, a flow meter capable of measuring in real time an inflow amount of wastewater can be used as inflow amount measurement means, or a level sensor capable of stepwisely detecting a wastewater level can be used. By driving the vertical floodgate depending upon a measurement result or a detection result from the inflow amount measurement means, wastewater can flow in the wastewater tank at a constant flow velocity.

INDUSTRIAL APPLICABILITY

As apparent from the above description, the grit chamber according to the present invention, constructed as mentioned above, provides advantages in that a flow velocity of wastewater which passes through the grit chamber can be substantially constantly maintained in spite of a significant fluctuation in the inflow amount of wastewater. Therefore, even in the case that the inflow amount of wastewater decreases, it is possible to prevent sand below a predetermined grain size and organic material and sludge having low specific gravity from sedimenting in a wastewater tank. As a consequence, only the material having high specific gravity such as sand possessing a relatively high grade of dryness can sediment and be removed.

Also, in the present invention, because only the material having high specific gravity such as sand possessing a relatively high grade of dryness can sediment and be removed, conveyance over a short distance, storage, and/or transportation to a reclaiming site, of the removed sand can be easily implemented with high economic efficiency, and the removed sand is not excluded from being used for a reclaiming purpose in the reclaiming site, thereby ensuring reliable use of the grit chamber.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A grit chamber for a wastewater treatment plant, including a wastewater tank having a front wall which is defined with a wastewater inlet, a rear wall which faces the front wall and is defined with a wastewater outlet, a pair of side walls which connect the front wall and the rear wall and a partitioning wall which is formed adjacent to the rear wall to extend across a space defined between the pair of side walls, and sand discharge means for discharging sand sedimented in a sand sedimentation zone which is delimited by the front wall, the pair of side walls and the partitioning wall, the grit chamber comprising:

a vertical floodgate installed on the partitioning wall and driven in a vertical direction to be opened downwardly from a top toward a bottom;

a floodgate driving motor coupled to one end of the vertical floodgate to directly drive the vertical floodgate;

an inflow amount measurement means for measuring an inflow amount of wastewater which passes through the wastewater tank; and control means connected to the floodgate driving motor and the inflow amount measurement means to control the floodgate driving motor in response to a measurement result of the inflow amount measurement means, wherein a wastewater level in the sand sedimentation zone is adjusted within a predetermined range through operation of the vertical floodgate so that a cross-sectional passage area of wastewater is changed to constantly maintain a flow velocity of wastewater which passes through the sand sedimentation zone, thereby preventing organic material which is contained in the wastewater and is other than sand, from sedimenting in the sand sedimentation zone.

2. The grit chamber according to claim 1, wherein the uppermost and lowermost levels of the predetermined range through which the vertical floodgate is operated correspond to a maximum amount and a minimum amount of wastewater which is introduced into the wastewater tank through the wastewater inlet.

3. The grit chamber according to claim 1, wherein a pair of rails are secured to an intermediate portion of the partitioning wall at both sides of the vertical floodgate, such that the vertical floodgate can be driven along the pair of rails by the floodgate driving motor to be opened downwardly from the top toward the bottom, thereby adjusting a wastewater level in the sand sedimentation zone.

4. The grit chamber according to claim 1, wherein the partitioning wall is diverged from the intermediate portion on which the vertical floodgate is installed, toward the front wall, so that left and right portions of the partitioning wall extend outward from the intermediate portion to the pair of side walls.

5. The grit chamber according to claim 1, wherein the inflow amount measurement means is a flow meter capable of measuring in real time an inflow amount of wastewater.

6. The grit chamber according to claim 5, wherein the flow meter is arranged adjacent to the wastewater inlet or the wastewater outlet to measure an inflow amount of wastewater which passes through the wastewater tank.

7. The grit chamber according to claim 1, wherein the inflow amount measurement means is a level sensor for stepwisely measuring an inflow amount of wastewater.

8. The grit chamber according to claim 7, wherein the level sensor is installed in the sand sedimentation zone to measure a change in wastewater level in the sand sedimentation zone, thereby stepwisely obtaining a change in an amount of wastewater.

* * * * *